United States Patent
Tanimoto (10) Patent No.: US 9,225,214 B2
(45) Date of Patent: Dec. 29, 2015

(54) DISK MOTOR AND ELECTRIC WORKING MACHINE INCLUDING THE SAME

(75) Inventor: Hideyuki Tanimoto, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 130 days.

(21) Appl. No.: 13/596,927

(22) Filed: Aug. 28, 2012

(65) Prior Publication Data

US 2013/0076192 A1    Mar. 28, 2013

(30) Foreign Application Priority Data

Sep. 28, 2011    (JP) .................................. 2011-213308

(51) Int. Cl.
*H02K 3/26* (2006.01)
*H02K 23/54* (2006.01)
*H02K 13/00* (2006.01)

(52) U.S. Cl.
CPC .................. *H02K 3/26* (2013.01); *H02K 23/54* (2013.01); *H02K 13/006* (2013.01)

(58) Field of Classification Search
CPC ......... H02K 27/12; H02K 27/20; H02K 3/28; H02K 3/12
USPC .................. 310/173, 180, 208, 224, 228, 237
See application file for complete search history.

(56) References Cited

U.S. PATENT DOCUMENTS

| | | | |
|---|---|---|---|
| 4,492,602 A * | 1/1985 | Lee et al. ........................ | 148/554 |
| 2004/0120117 A1* | 6/2004 | Tan et al. ........................ | 361/704 |
| 2005/0167183 A1* | 8/2005 | Tominaga et al. .............. | 180/444 |
| 2005/0184604 A1* | 8/2005 | Ooiwa .............................. | 310/58 |
| 2007/0104593 A1* | 5/2007 | Yamaguchi ..................... | 417/354 |
| 2011/0154796 A1* | 6/2011 | Onose .............................. | 56/233 |

FOREIGN PATENT DOCUMENTS

| | | |
|---|---|---|
| JP | 58-51678 U | 4/1983 |
| JP | 2004-80996 A | 3/2004 |
| JP | 3636700 B2 | 4/2005 |
| JP | 2011-98421 A | 5/2011 |

OTHER PUBLICATIONS

Japanese Office Action for the related Japanese Patent Application No. 2011-213308 dated Feb. 25, 2015.

* cited by examiner

*Primary Examiner* — Terrance Kenerly
(74) *Attorney, Agent, or Firm* — Kenealy Vaidya LLP (57) ABSTRACT

A disk motor including: a rotor including, a commutator disk including a commutator pattern, and at least one coil disk including a coil pattern; a stator including a magnetic flux generating part opposed to the coil pattern of the coil disk; an electric current supply part configured to supply electric current to the coil pattern via the commutator disk and, an output shaft configured to be rotated by a rotational force of the rotor, wherein a radiating pattern is provided to an outer periphery side of the commutator pattern of the commutator disk.

14 Claims, 8 Drawing Sheets

81: STATOR

FIG. 4

82 : ROTOR

FIG. 5

82 : ROTOR

361: FIRST COIL DISK (UPPER SURFACE)

FIG. 8B

361: FIRST COIL DISK (LOWER SURFACE)

FIG. 9A

361 : FIRST COIL DISK (UPPER SURFACE)

FIG. 9B

361 : FIRST COIL DISK (LOWER SURFACE)

DISK MOTOR AND ELECTRIC WORKING MACHINE INCLUDING THE SAME

CROSS-REFERENCE TO RELATED APPLICATIONS

This application claims priority from Japanese Patent Application No. 2011-213308 filed on Sep. 28, 2011, the entire contents of which are incorporated herein by reference.

TECHNICAL FIELD

Aspects of the present invention relate to a disk motor including a coil disk and a commutator disk to rotationally drive an output shaft thereof and an electric working machine including the same.

BACKGROUND

A related-art disk motor includes an output shaft, an approximately disk-shaped coil disk fixed to the output shaft and printed with a coil pattern, a commutator disk having a commutator pattern connected to the coil pattern, a magnet disposed to face the coil pattern and a brush for applying electric current to the commutator pattern (see, Japanese Patent No. 3636700).

A rotational number of the disk motor is determined in accordance with a voltage supplied from the brush, an electric current of the disk motor, a coil pattern of the coil disk, a magnetic flux of the magnet and a number of the brushes (number of poles). When the voltage supplied from the brush and the electric current of the disk motor are constant, it is possible to set the rotational number of the disk motor at a desired rotational number by changing the coil pattern of the coil disk, the magnetic flux of the magnet and the number of the brushes.

JP-A-2004-80996 is not directed to a disk motor but to a technology for improving a cooling and radiating performance of a stator coil in a commutator motor by increasing the cooling and radiating surface area of the stator coil.

SUMMARY

In order to achieve a high output power in a disk motor, it is necessary to increase electric current supplied to the coil pattern. However, when a large electric current flows in the commutator pattern, heating of the commutator disk due to electrical resistance becomes a problem. As a countermeasure for such a heating problem, there is no proper disclosure in either of Japanese Patent No. 3636700 and JP-A-2004-80996. The technology of JP-A-2004-80996 relates to a cooling of a coil in a configuration that winding is arranged around a core and is not suitable for radiation of a coil disk having a coil pattern.

Aspects of the present invention has been made to solve the above-described problems and an object of the present invention is to provide a disk motor having an improved radiation performance as compared to related-art and an electric working machine including such a disk motor.

According to an aspect of the invention, there is provided a disk motor including: a rotor including, a commutator disk including a commutator pattern, and at least one coil disk including a coil pattern; a stator including a magnetic flux generating part opposed to the coil pattern of the coil disk; an electric current supply part configured to supply electric current to the coil pattern via the commutator disk and, an output shaft configured to be rotated by a rotational force of the rotor, wherein a radiating pattern is provided to an outer periphery side of the commutator pattern of the commutator disk.

The radiating pattern may be provided on the commutator disk.

The radiating pattern may be provided on at least a surface of the commutator disk that contacts with the electric current supply part.

The radiating pattern may be provided on both surfaces of the commutator disk, and the radiating patterns on both surfaces may be connected to each other by a thermal conductive material penetrating through the commutator disk.

The commutator disk and the coil disk may have substantially the same outer diameter.

The radiating pattern may be provided at a position in a radial direction that faces the magnetic flux generating part.

The radiating pattern may be divided into a plurality of segments in at least one of a radial direction and a circumferential direction.

The radiating pattern and the commutator pattern may be made of the same material.

The radiating pattern may include an extended radiating pattern which extends from the commutator pattern.

The commutator pattern may be divided into a plurality of segments, and the extended radiating pattern does not short-circuit between different segments of the commutator pattern.

The radiating pattern may include an insulated radiating pattern which is insulated from the commutator pattern.

According to another aspect of the invention, there is provided an electric working machine including the above-described disk motor.

Any combinations of the above components and a modification thereof are also effective as an aspect of the present invention.

According to aspects of the present invention, since the radiating pattern is provided to an outer periphery side of the commutator pattern of the commutator disk, it is possible to realize a disk motor having an improved radiation performance as compared to related art. Further, it is possible to realize an electric working machine including such a disk motor.

BRIEF DESCRIPTION OF DRAWINGS

FIG. 9 (9A, 9B) is a view explaining a coil pattern of the first coil disk 361;

DETAILED DESCRIPTION

Hereinafter, a preferred embodiment of the present invention will be described by referring to the accompanying drawings. The same or similar reference numerals are applied to the same or similar parts and elements throughout the drawings, and the duplicated description thereof will be omitted. Further, the embodiment is illustrative and is not intended to limit the present invention. It should be noted that all the features and their combinations described in the embodiment are not necessarily considered as an essential part of the present invention.

Figure 1:
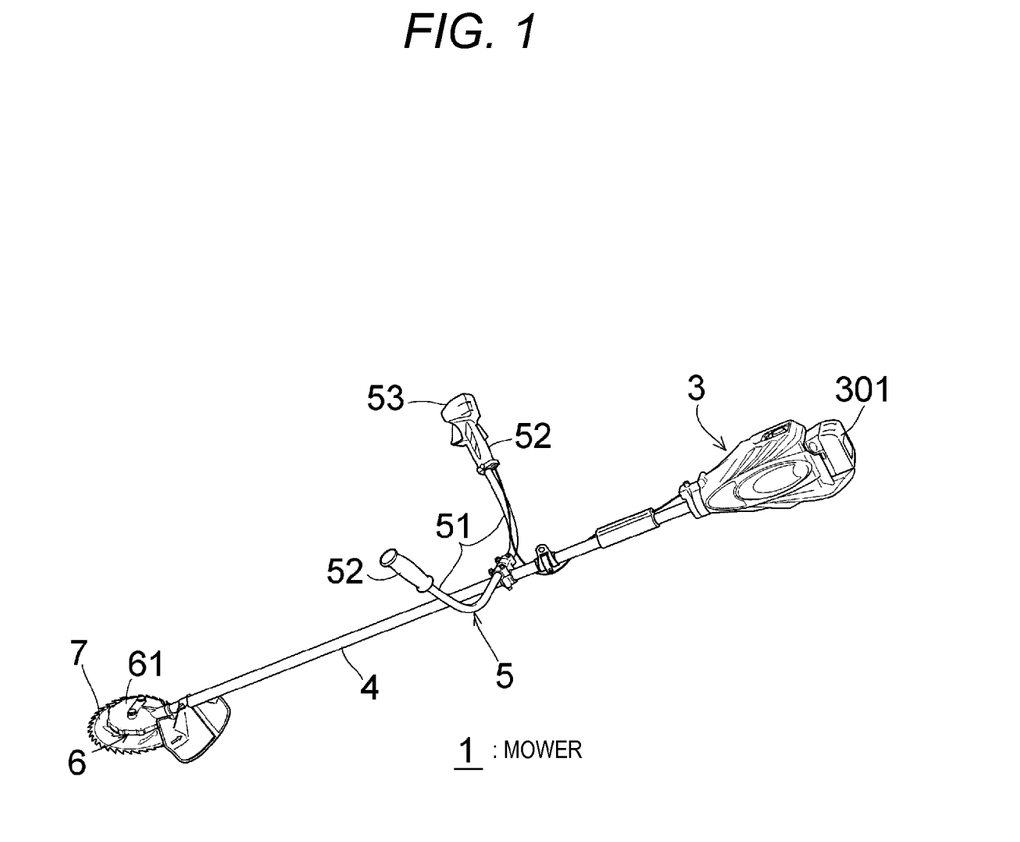
FIG. 1 is a perspective view illustrating a mower 1 according to a first embodiment of the present invention.

FIG. 1 is a perspective view illustrating a mower 1 according to an embodiment of the present invention. The mower 1 as an example of an electric working machine. The mower 1 includes a power supply part 3, a pipe part 4, a handle part 5, a driving part 6 and a cutting blade 7.

The power supply part 3 includes a removable battery 301 as a power supply. The pipe part 4 mechanically connects the power supply part 3 and the driving part 6. Further, wirings (not-illustrated) electrically connecting the power supply part 3 and the driving part 6 are inserted in the inside of the pipe part 4. Power is supplied from the power supply part 3 to the driving part 6 via the wirings. The driving part 6 includes a head housing 61 in which a disk motor is accommodated. The driving part 6 is configured to rotationally drive the cutting blade by the power supplied from the power supply part 3. The configuration of the disk motor will be described later.

The handle part 5 is fixedly attached to the middle of the pipe part 4, i.e., between the power supply part 3 and the driving part 6. The handle part 5 is configured by mounting a grip 52 on leading ends of a pair of arms 51, respectively. One grip 52 is provided with a throttle 53. As an operator operates the throttle 53, it is possible to adjust the power supplied to the driving part 6. That is, it is possible to adjust a rotational number of the cutting blade 7. The cutting blade 7 is formed in an approximately disk shape and provided at its peripheral edge with serrations. Further, the cutting blade is provided at its central portion with a hole (not-illustrated). The hole is mounted on an output shaft of the disk motor (will be described later).

Figure 2:
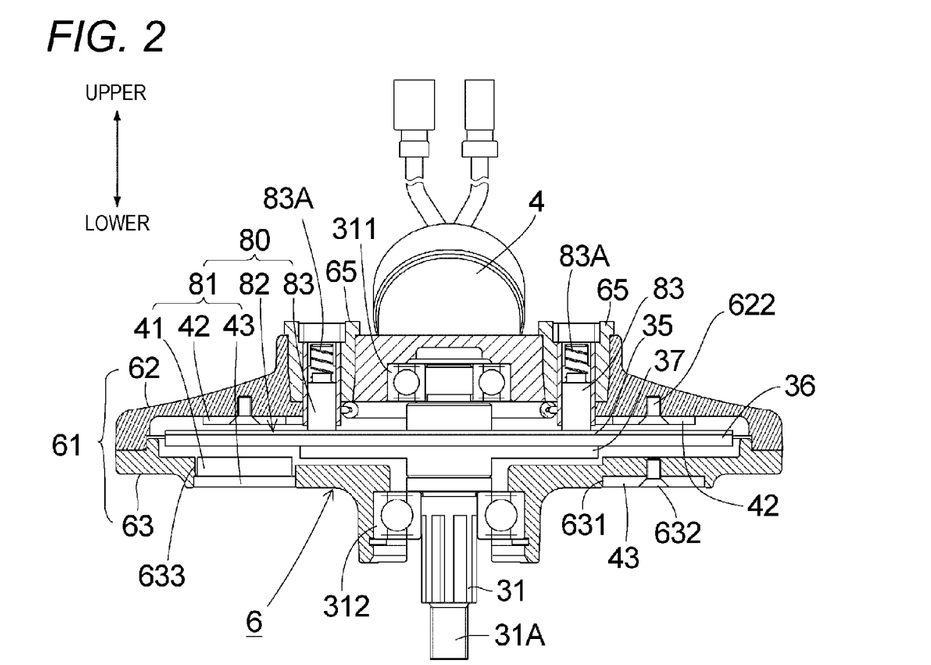
FIG. 2 is a front cross-sectional view illustrating a driving part 6 of the mower 1 illustrated in FIG. 1.

FIG. 2 is a front cross-sectional view illustrating the driving part 6 of the mower 1 illustrated in FIG. 1. As illustrated in FIG. 2, the extending direction of an output shaft 31 is defined as a vertical direction. The driving part 6 includes a disk motor 80 which is accommodated in a case 61. The case 61 is made of metal, for example, aluminum. The case 61 is configured by integrally fitting a cover part 62 and a base part 63. The disk motor 80 includes a stator 81, a rotor 82 and a pair of brushes 83. The pair of brushes 83 are symmetrically provided with respect to a rotational shaft (output shaft 31) of the disk motor 80 and supported on a brush holder 65 of the cover part 62. Each brush 83 is urged (downward) toward a commutator disk 35 (to be described later) by a spring 83A so that a lower surface thereof contacts a commutator pattern made of conductor such as a copper on the commutator disk 35. The brush 83 is connected to the power supply part 3 of FIG. 1 and serves as an electric current supply part to supply electric current to a coil pattern (to be described later) of the rotor 82.

The stator 81 includes a magnet 41 as a magnetic flux generating part, an upper yoke 42 and a lower yoke 43. The upper yoke 42 and the lower yoke 43 are made of soft magnetic material. The upper yoke 42 is formed in a ring shape and fixed to a lower surface of the cover part 62 by a screw 622, for example. The lower yoke 43 is formed in a ring shape which has a diameter substantially the same as a diameter of the upper yoke 42. The lower yoke 43 is fixed into a ring-shaped groove 631 formed on a lower surface of the base part 63 by a screw 632, for example. The magnet 41 is fixedly fitted into a hole part 633 which is formed on an upper surface of the base part 63.

Figure 3:
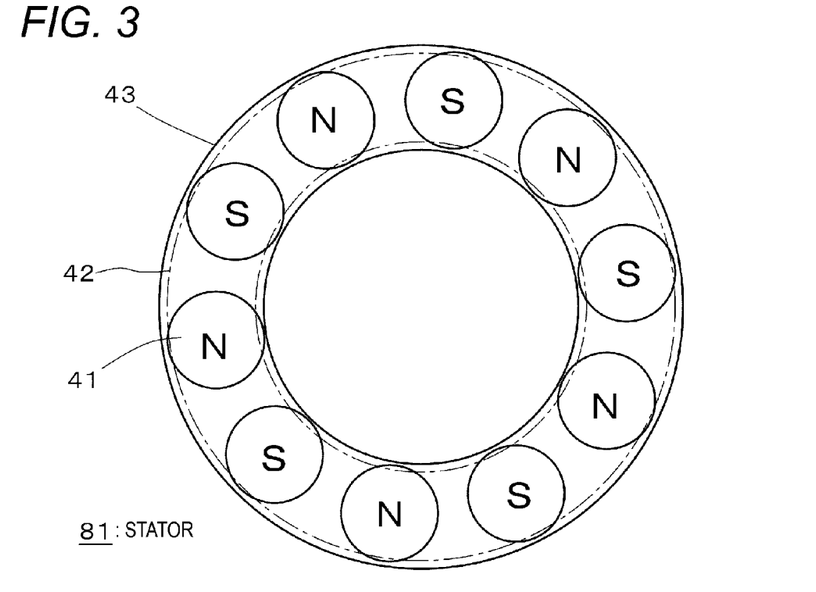
FIG. 3 is a schematic plan view illustrating a stator 81 illustrated in FIG. 2.

FIG. 3 is a schematic plan view illustrating the stator 81 illustrated in FIG. 2. As illustrated in FIG. 3, the magnets 41 are formed into a disk shape, for example. Further, a plurality of (for example, ten) magnets 41 are disposed side by side in an equiangular pitch on a circumference of the stator. In addition, the same number of the hole parts 633 of FIG. 2 accommodating the magnets 41 are placed side by side on a circumference thereof. The center of the circumference is substantially coincident with a rotation center of the disk motor 80. Magnetic poles of upper surfaces in adjacent magnets 41 are different from each other. Although a rare earth magnet such as a neodymium magnet can be desirably used as the magnet 41, a sintered magnet such as a ferrite magnet may also be used. The upper yoke 42 and the lower yoke 43 are intended to increase the magnetic flux density applied to the coil pattern of the rotor 82 (to be described later).

As illustrated in FIG. 2, the rotor 82 includes the output shaft 31 (rotor shaft), a commutator disk 35, a coil part 36 (laminate of coil disks) and a supporting member 37. The output shaft 31 is rotatably supported by an upper bearing 311 fixed to the cover part 62 and a lower bearing 312 fixed to the base part 63. A male screw 31A is formed on a lower side end of the output shaft 31 and the cutting blade 7 of FIG. 1 is fixed to the male screw 31A by a fastener (not-illustrated). The upper surface of the commutator disk 35 is a contact surface (sliding surface) with the brush 83. Electric current is supplied from the power supply part 3 illustrated in FIG. 1 to the coil part 36 via the brush 83 and the commutator disk 35.

Figure 4:
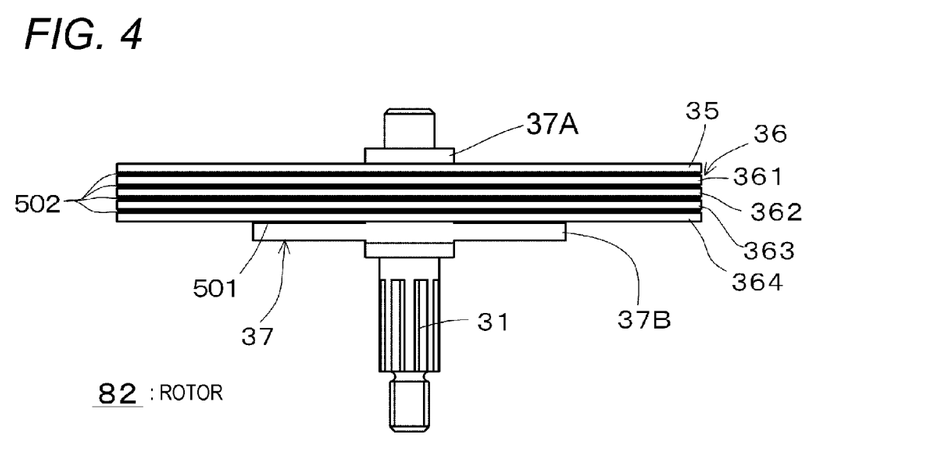
FIG. 4 is a front view illustrating a rotor 82 illustrated in FIG. 2.
Figure 5:
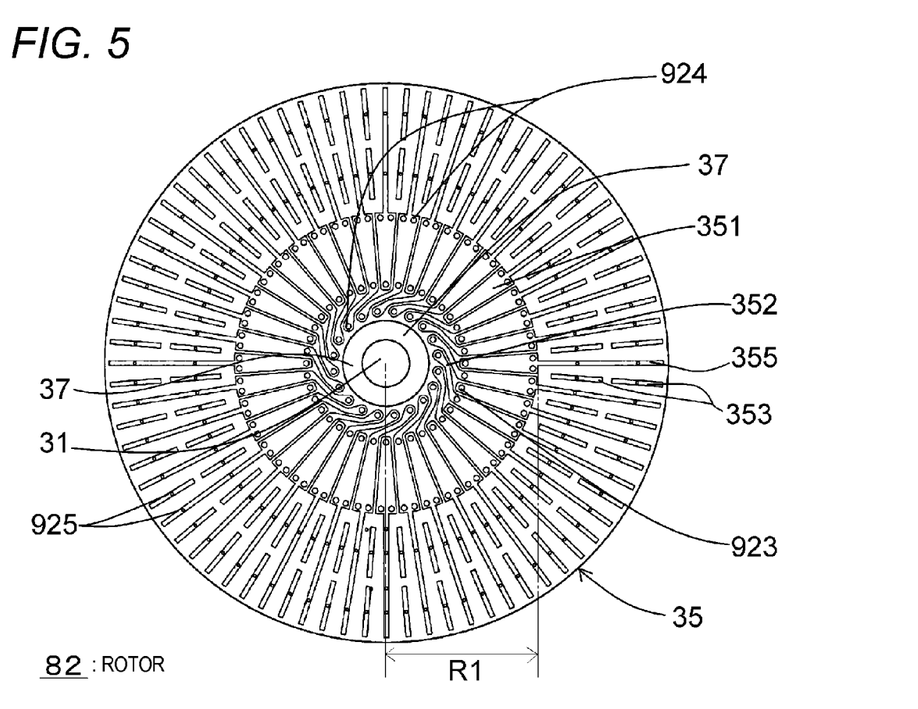
FIG. 5 is a plan view illustrating the rotor 82 illustrated in FIG. 2.
Figure 6:
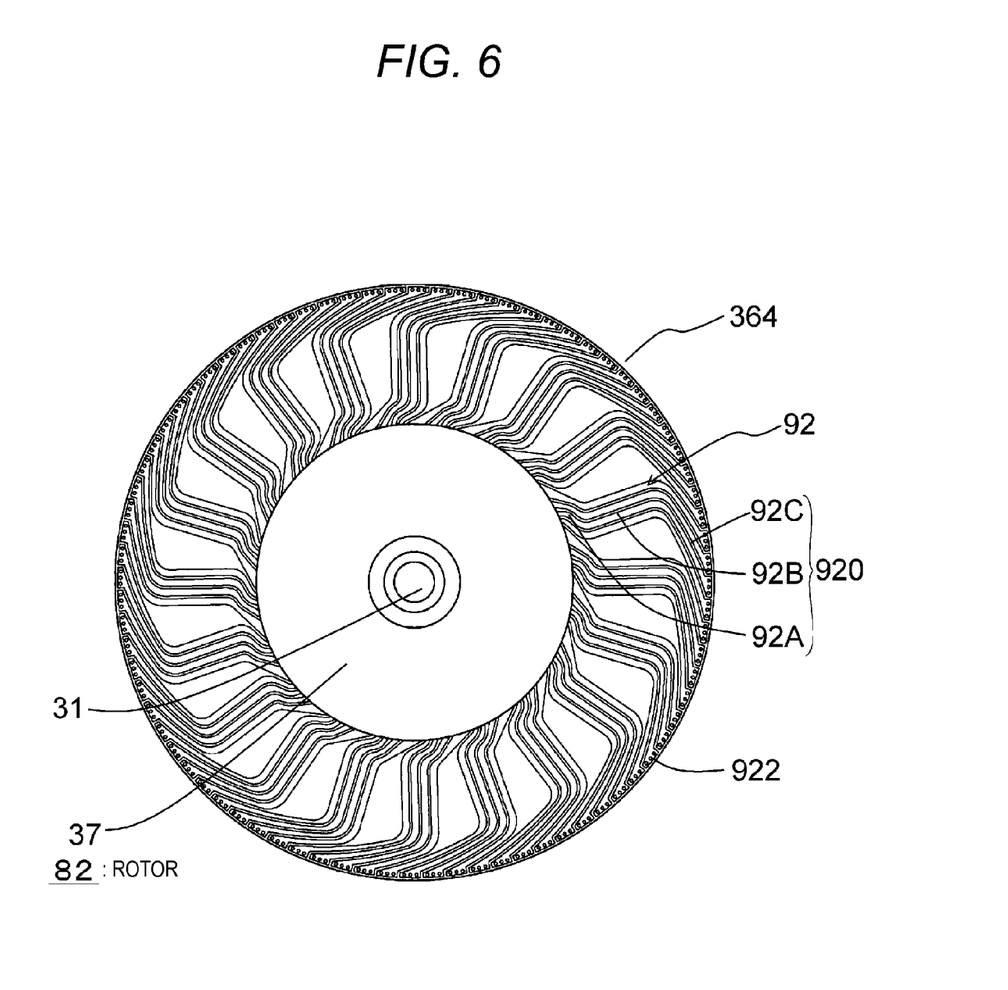
FIG. 6 is a bottom view illustrating the rotor 82 illustrated in FIG. 2.

FIG. 4 is a front view illustrating the rotor 82 illustrated in FIG. 2, FIG. 5 is a plan view thereof and FIG. 6 is a bottom view thereof.

As illustrated in FIG. 4, the coil part 36 includes a first coil disk 361 to a fourth coil disk 364. The commutator disk 35 and the first coil disk 361 to the fourth coil disk 364 are laminated to form a set of rotor board while sandwiching a sheet-like (insulation) adhesive layer 502 therebetween, respectively. The sheet-like adhesive layer 502 has the same shape as each coil disk as viewed in an axial direction and covers substantially the entire surface of each coil disk.

Each of the first coil disk 361 to the fourth coil disk 364 is configured so that a coil pattern (will be described later) is formed on both sides of an insulating resin board (for example, a glass fiber reinforced epoxy resin board). The commutator disk 35 is configured so that a commutator pattern and a radiating pattern (both to be described later) are formed on an insulating resin board (for example, a glass fiber reinforced epoxy resin board) of which diameter is substantially equal to that of each coil disk. The commutator disk 35 is fixedly adhered to an upper surface (upper surface of the first coil disk 361) of the coil part 36.

The supporting member 37 is made of, for example, resin such as nylon and is coaxially fixed to the output shaft 31. The supporting member 37 includes a cylinder part 37A formed in a substantially cylindrical shape and a boss 37B (flange) formed in a substantially disk shape. The boss 37B has a diameter smaller than that of each coil disk and is projected outward from the side of the cylinder part 37A in a vertical direction relative to the output shaft 31. The set of rotor board is placed on an upper surface of the boss 37B via a sheet-like adhesive layer 501 (or adhesive such as epoxy adhesive). Here, the sheet-like adhesive layer 501 has the same shape as the boss 37B, as seen in an axial direction. And then, the commutator disk 35, the coil part 36 and the boss 37B are subjected to a hot press (pressed in a lamination direction in a heated state) and thus integrally adhered in a laminated state.

As illustrated in FIG. 5, a commutator pattern 351 is formed on the commutator disk 35 and is radially divided into 40 segments. Segments of predetermined positions are connected to each other. For example, two segments (the first segment and the ninth segment, or the second segment and the tenth segment, etc.) between which seven segments are interposed are connected to each other by a connection pattern (not-illustrated) which is formed on a surface opposite to a connection pattern 352 formed inside. The connection pattern may be formed on the coil disk. A commutator pattern 351 of the commutator disk 35 and a coil pattern of at least one of the first coil disk 361 to the fourth coil disk 364 are electrically connected to each other by a through-hole 923.

The commutator pattern 351 is provided in a circular region within a radius R1 from the center on the commutator disk 35. Meanwhile, an insulated radiating pattern 353 and an extended radiating pattern 355 as a radiating pattern are provided in a region outside of the circular region, that is, a ring-shaped region on the commutator disk 35 other than the circular region. The ring-shaped region is a region facing the magnet 41 (magnetic flux generating part) of the stator 81 illustrated in FIGS. 2 and 3.

Both the insulated radiating pattern 353 and the extended radiating pattern 355 extend in a radial direction of the commutator disk 35. The commutator pattern 351, the insulated radiating pattern 353 and the extended radiating pattern 355 are made of a conductive material such as copper. Preferably, these patterns are made of the same material and formed by the same etching process. The commutator pattern 351, the insulated radiating pattern 353 and the extended radiating pattern 355 have substantially the same height from a board surface of the commutator disk 35.

The insulated radiating pattern 353 is insulated from the commutator pattern 351 and the extended radiating pattern 355 extends from the commutator pattern 351. The insulated radiating pattern 353 is divided into a plurality of segments in both a radial direction and a circumferential direction of the commutator disk 35. In an example of FIG. 5, the insulated radiating pattern is divided into 2 segments in the radial direction and 40 segments in the circumferential direction. The extended radiating pattern 355 is divided into 40 segments in a circumferential direction of the commutator disk 35. Each of the insulated radiating patterns 353 and the extended radiating patterns 355 has a width in a circumferential direction smaller than each segment of the commutator pattern 351. Each of the extended radiating patterns 355 extends from only one segment of the commutator pattern 351 and does not bridge (short-circuit) between different segments of the commutator pattern 351. At this time, since the extended radiating pattern 355 is not only narrow in width but also becomes a dead-end of a current path, the extended radiating pattern is configured such that an electrical resistance is high and an electric current does not flow (or flow only a little) therein.

As illustrated in FIG. 6, the fourth coil disk 364 includes a coil pattern 92 (other coils also have coil pattern). The coil pattern 92 will be described later by referring to FIGS. 8 and 9.

Figure 7:
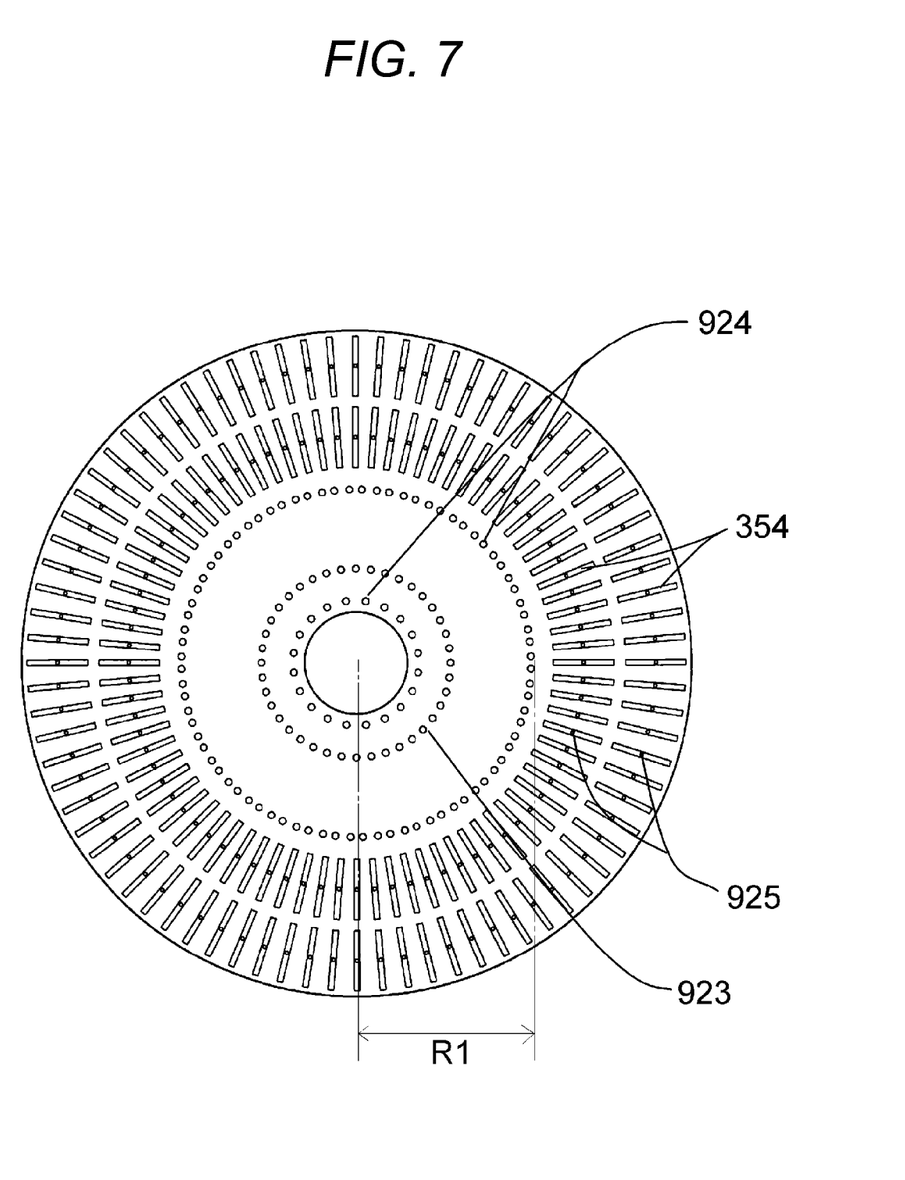
FIG. 7 is a bottom view illustrating a commutator disk 35 illustrated in FIG. 4.

FIG. 7 is a bottom view illustrating a commutator disk 35 (a view illustrating a surface opposing the first coil disk 361). An insulated radiating pattern 354 as a radiating pattern is provided at an outside of a circular region within a radius R1 from a center in a bottom side of the commutator disk 35, that is, a ring-shaped region other than the circular region. The insulated radiating pattern 354 is divided into a plurality of segments in both a radial direction and a circumferential direction of the commutator disk 35. A connection pattern is provided in a circular region within a radius R1 from a center in a bottom side of the commutator disk 35 and connects between the segments of the commutator pattern 351 illustrated in FIG. 5. However, illustration of the connection pattern is omitted.

The insulated radiating pattern 353 and the extended radiating pattern 355 (surface side radiating pattern) illustrated in FIG. 5 and the insulated radiating pattern 354 (backside radiating pattern) illustrated in FIG. 7 are connected (coupled) to each other by a radiating through-hole 925, respectively. A high thermal conductivity material such as copper is plated in an inner surface of the radiating through-hole 925. Alternatively, a high thermal conductivity material such as copper may be embedded into an inner side of the radiating through-hole 925.

Figure 8A:
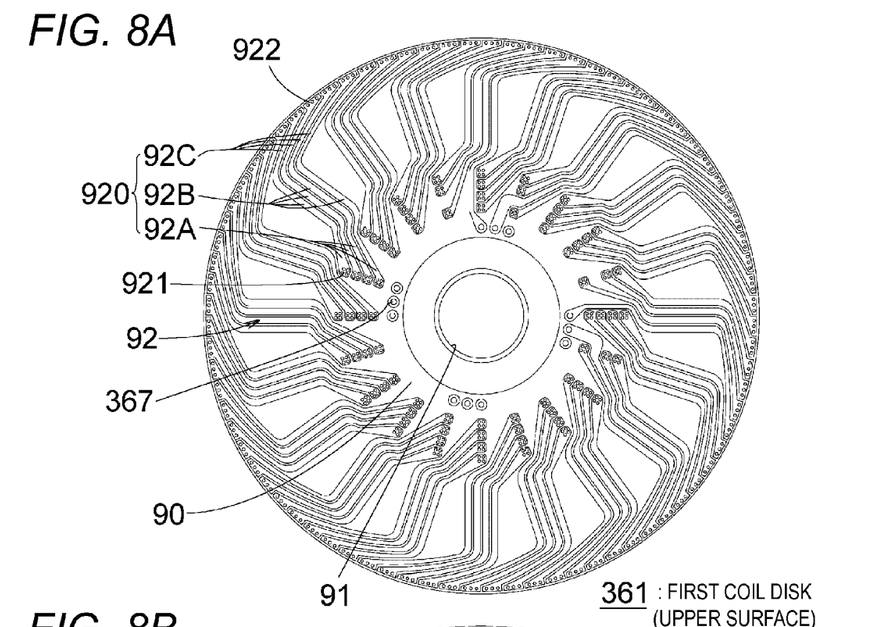
FIG. 8A is a plan view illustrating a first coil disk 361 illustrated in FIG. 4
Figure 8B:
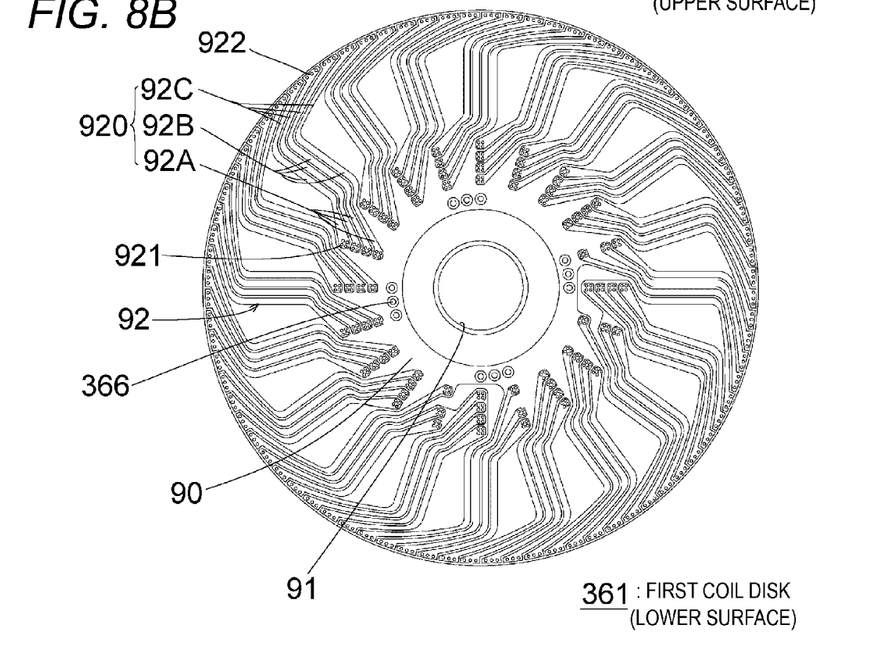
FIG. 8B is a bottom view illustrating the first coil disk 361.

The shape of the coil pattern is not particularly limited but a suitable example thereof will be described. FIG. 8A is a plan view illustrating a first coil disk 361 illustrated in FIG. 4 and FIG. 8B is a bottom view illustrating the first coil disk 361. Since the other coil disks have the same configuration and pattern as the first coil disk 361, only the first coil disk 361 will be described herein.

The first coil disk 361 includes coil patterns 92 which are respectively provided on both surfaces of a disk-shaped insulating board 90. The cylinder part 37A of FIG. 5 is inserted into a through-hole 91 which is provided in the center of the insulating board 90. A total of twelve through-holes 366 connecting between layers are formed in such a way that three through-holes 366 are provided at an interval of every 90° around the center of the insulating board 90. A distance from each through-hole 366 to the center of the insulating board 90 is equal to each other. Each through-hole 366 is communicated with any one of the through-holes 923 which are formed on the commutator disk 35.

The coil pattern 92 is made of a conductive material such as copper and formed by carrying out an etching process in a state where both surfaces of a disk-shaped insulation board 90 are laminated with a conductive material such as a copper foil and covered with a mask. The coil pattern 92 includes a group 920 of partial coil pattern composed by a pattern of four columns which are adjacent to each other and have substantially equal width. Twenty groups 920 of partial coil pattern are provided in both surfaces of the first coil disk, respectively. The group 920 of partial coil pattern is obtained by sequentially connecting a group 92A of inside connection pattern, a group 92B of radial pattern and a group 92C of outside connection pattern. The groups 92A of inside connection pattern on both surfaces are electrically connected to each other by a through-hole 921 which is formed in the vicinity of an end thereof. The groups 92C of outside connection pattern on both surfaces are electrically connected to each other by a through-hole 922 which is formed in the vicinity of an end thereof. The group 92B of radial pattern extends radially outward from a center side of the insulating board 90 and spans between the group 92A of inside connection pattern and the group 92C of outside connection pattern. The groups 92B of radial pattern on both surfaces are present in substantially the same position, as viewed in an axial direction. The groups 92B of radial pattern on each surface are present in an equiangular pitch around the center of the insulating board 90. The groups 92B of radial pattern are located immediately above the arranged circumference (circumference in which a center of each magnet 41 is arranged) of magnets 41 illustrated in FIGS. 2 and 3. That is, the groups 92B of radial pattern passes through a region immediately above the magnet 41 in accordance with the rotation of each coil disk. A rotational force is obtained by an electromagnetic force between an electric current flowing in the groups 92B of radial pattern and a magnetic field generated by the magnet 41.

Figure 9A:
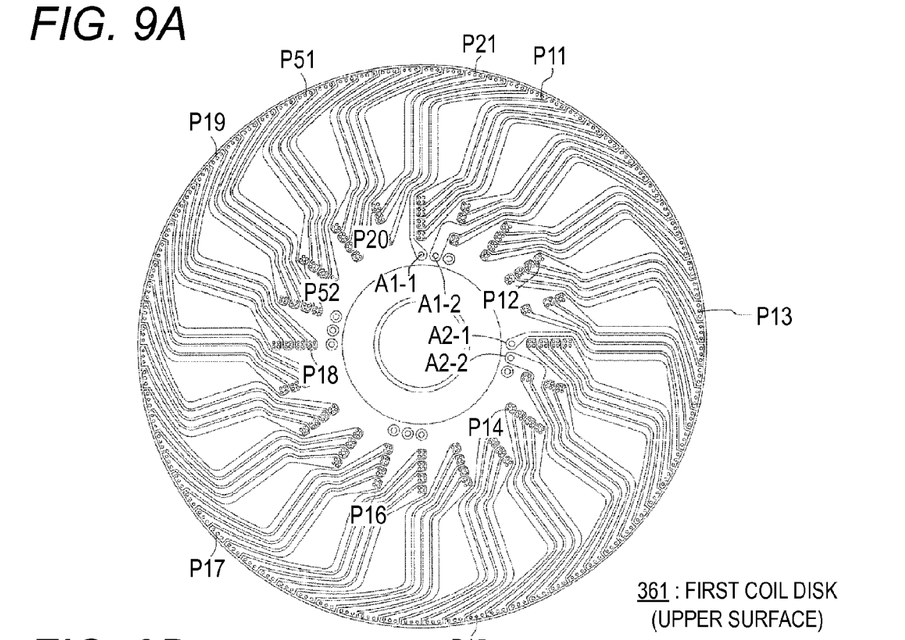
Figure 9B:
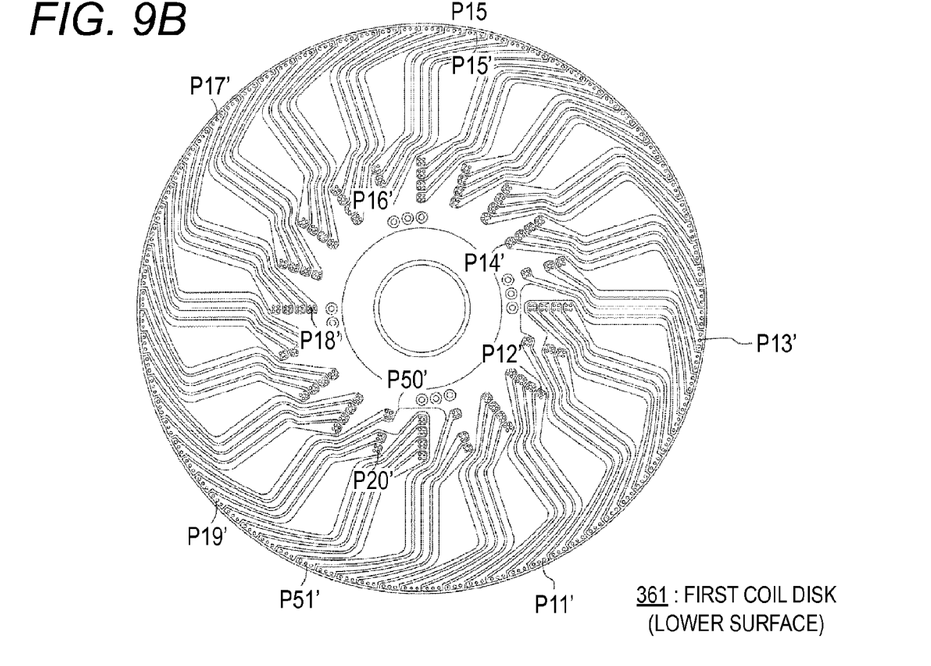

FIGS. 9A and 9B are views explaining a coil pattern of the first coil disk 361. FIGS. 9A and 9B are the same as FIGS. 8A and 8B, except for the symbols indicated. The coil pattern 92 of the first coil disk 361 includes two coils. In FIG. 9A, a starting point of one coil is represented as A1-1 and an ending point thereof is represented as A1-2. Further, in FIG. 9A, a starting point of the other coil is represented as A2-1 and an ending point thereof is represented as A2-2. The one coil continuously extends from the starting point A1-1 via points P11, P11', P12', P12, P13, P13', . . . , P19', P20'. In this way, the one coil goes round in a clockwise direction from the starting point A1-1, as seen from the above. Similarly, the one coil goes round a total of four times in a clockwise direction and reaches a point P50'. And then, the one coil goes round a total of four times in a counterclockwise direction from the point P50' via points P51', P51, . . . , and reaches the ending point A1-2. Similarly, the other coil continuously extends from starting point A2-1 to an end point A2-2.

Connection relationship between the one coil included in the first coil disk 361 and the commutator pattern 351 of the commutator disk 35 is established such that the commutator pattern connected to the ending point A1-2 is electrically connected to the other brush 83 when the commutator pattern connected to the starting point A1-1 is electrically connected to one brush 83. This connection relationship can be similarly applied to the other coil (starting point A2-1, ending point A2-2). Further, this connection relationship may be similarly applied to coils included in the other coil disks. Each coil is energized from the brush 83 through the commutator disk 35 so that the group 92B of radial pattern of each coil disk passing over a magnetic pole surface of the magnet 41 generates a rotational torque in the same direction.

According to the present invention, the following effects can be achieved.

(1) Since the insulated radiating pattern 353 and the extended radiating pattern 355 are provided at a ring-shaped region outside of the radius R1 on a surface of the commutator disk 35 by enlarging a diameter of the commutator disk 35 with respect to a board diameter R1 (see, FIG. 5) required for forming the commutator pattern 351, an improved cooling efficiency is achieved, as compared to a case of using a related-art commutator disk (which has a board diameter of R1 and on which the radiating pattern is not provided). Further, since an existing related-art commutator disk is used, it is possible to suppress increase in the number of parts.

(2) Since the extended radiating pattern 355 is connected to each segment of the commutator pattern 351, a cooling efficiency of the commutator disk 35 is improved. Further, since the extended radiating pattern 355 is made of the same material as the commutator pattern 351, heat is easily transmitted and thus cooling efficiency is improved.

(3) Since the insulated radiating pattern 354 is provided at a ring-shaped region outside of the radius R1 on a backside of the commutator disk 35, it is possible to effectively cool the heat between the commutator disk 35 and the first coil disk 361. Accordingly, cooling efficiency is improved as compared to a case in which the insulated radiating pattern 354 is not provided.

(4) The surface side radiating pattern (the insulated radiating pattern 353 and the extended radiating pattern 355) and the backside radiating pattern (the insulated radiating pattern 354) of the commutator disk 35 are connected (coupled) to each other by the radiating through-hole 925, respectively. Accordingly, the heat generated from the backside of the commutator disk 35 to which air (cooling air) does not flow is conducted from the insulated radiating pattern 354 to the insulated radiating pattern 353 and the extended radiating pattern 355 via the radiating through-hole 925. As a result, heat is discharged from the surface side (against which the air (cooling air) directly strikes) of the commutator disk 35 which can be relatively easily cooled. Accordingly, a cooling efficiency of the commutator disk 35 is improved, as compared to a case in which the radiating through-hole 925 is not provided.

(5) Since each of the radiating patterns is divided into a plurality of segments, it is possible to reduce a loss (heat generation) due to an eddy current generated at the radiating patterns. Accordingly, cooling efficiency is improved.

(6) Since a cooling performance is improved as mentioned above, even in a disk motor of high output power, it is possible to withstand the heat generated thereby. Accordingly, the performance of the disk motor and the electric working machine including the same can be desirably improved.

(7) Since the commutator disk 35 and the coil disk have the same outer diameter, it is not necessary to enlarge an outer diameter of the disk motor for providing the radiating patterns, and further, manufacturing is easy.

(8) Since the commutator pattern 351 and the radiating pattern can be formed at a time by one etching process, it is possible to simplify manufacturing process and to suppress increase in cost.

While description has been made in connection with particular embodiments of the present invention, it will be obvious to those skilled in the art that various changes and modifications may be made therein without departing from the scopes of the claims. Hereinafter, modified embodiments will be described.

A modified embodiment in which only one of the insulated radiating pattern 353 and the extended radiating pattern 355 is provided is also effective. Specifically, all of the radiating patterns may be connected to each segment of the commutator pattern 351 or all of the radiating patterns may be insulated from each segment of the commutator pattern 351.

An extending direction of the radiating pattern is not limited to a radial direction of the commutator disk 35 but may be a circumferential direction or any other direction.

The divided number of the radiating pattern is optional and not limited to the number illustrated in the above embodiment.

The backside radiating pattern (the insulated radiating pattern 354) of the commutator disk 35 may be omitted.

It is preferable that the radiating patterns are arranged in the entire circumference to give even weight balance so that the rotor 82 can be stably rotated. The above embodiment is configured so that the same pattern appears at positions symmetrical to a rotational axis.

Figure 10:
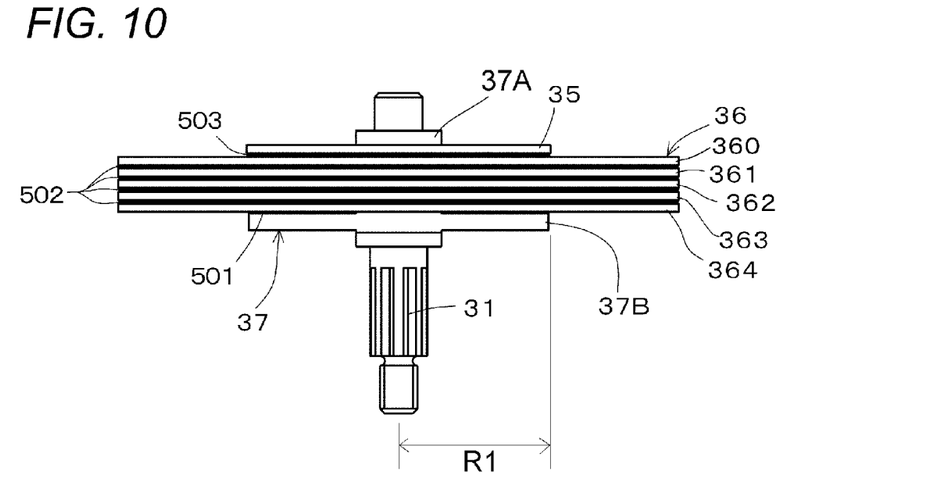
FIG. 10 is a front view illustrating a rotor according to a modified embodiment.
Figure 11:
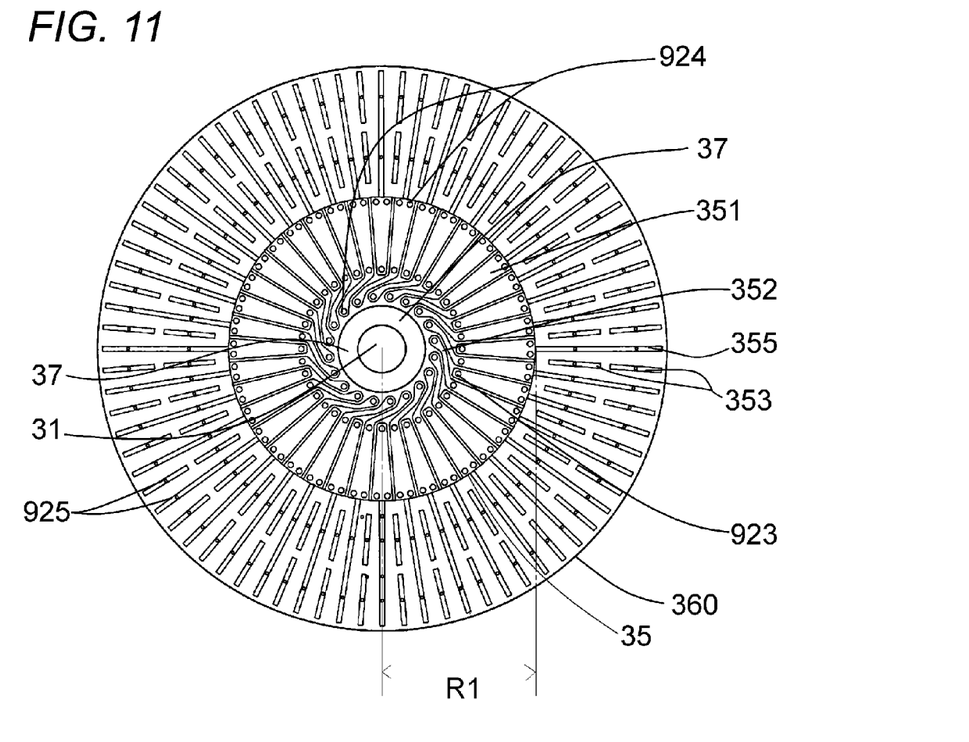
FIG. 11 is a plan view illustrating a rotor according to the modified embodiment.

Instead of providing the radiating patterns on the commutator disk 35, another board having the same radiating patterns may be placed between the commutator disk 35 and the first coil disk 361. FIG. 10 is a front view illustrating a rotor according to such a modification and FIG. 11 is a plan view thereof. In such a modification, the commutator disk 35 has a board radius R1 and the radiating patterns are not provided thereon, similarly to related art. A radiating disk 360 has a diameter substantially equal to the coil disk and is laminated on the first coil disk 361 with a sheet-like (insulation) adhesive layer 502 interposed therebetween. The commutator disk 35 is laminated on the radiating disk 360 with a sheet-like (insulation) adhesive layer 503 interposed therebetween. Herein, the sheet-like adhesive layer 503 has a diameter substantially equal to the commutator disk 35. In this modification, it is not essential that the insulated radiating pattern 353 and the extended radiating pattern 355 in a surface side of the radiating disk 360 are arranged in a region outside of the radius R1. This is similarly applied to the backside of the radiating disk. Each of the extended radiating patterns 355 may be connected (coupled) to each segment of the commutator pattern 351 by a through-hole (not-illustrated).

Although it is not essential that the shape of the coil disk and the commutator disk is formed in a precise discoid shape, it is preferable that the shape falls within a range regarded as substantially circle, as viewed in an axial direction.

In addition, the number and arrangement pitch angle of the magnets, the winding numbers of the coil pattern (the column number of the coil pattern), the lamination number of the coil disks, the number of the pin insertion holes or through-holes and other parameters can be suitably set depending on a required performance or cost. Further, the winding numbers of the coil pattern may be different for each coil disk. When there is only one column of coil pattern, each term of "a group of partial coil pattern," "a group of inside connection pattern," "a group of radial pattern," and "a group of outside connection pattern" in the description of the above embodiment should be replaced by omitting the word "a group of" therefrom.

The electric working machine may be various electric tools which include a rotational driving part driven by a disk motor, in addition to the mower described in the above embodiment. For example, the electric working tool may be a belt sander or a rotary band saw, on which the disk motor is mounted.

What is claimed is:

1. A disk motor comprising:
    a rotor including,
        a commutator disk including a commutator pattern, and
        at least one coil disk including a coil pattern;
    a stator including a magnetic flux generating part opposed to the coil pattern of the coil disk;
    an electric current supply part configured to supply electric current to the coil pattern via the commutator disk and,
    an output shaft configured to be rotated by a rotational force of the rotor,
    wherein a radiating pattern, which is a printed-wiring including a conductive material forming a heat-dissipation path on a surface of an insulating board, is provided to an outer periphery side of the commutator pattern of the commutator disk, is provided at a position in a radial direction that faces the magnetic flux generating part, is provided to overlap the coil pattern of the coil disk in the axial direction of the output shaft, and is provided to be sandwiched between the magnetic flux generating part and the coil pattern of the coil disk.

2. The disk motor according to claim 1, wherein the radiating pattern is provided on the commutator disk.

3. The disk motor according to claim 2, wherein the radiating pattern is provided on both surfaces of the commutator disk, and
    the radiating patterns on both surfaces are connected to each other by a thermal conductive material penetrating through the commutator disk.

4. The disk motor according to claim 2, wherein the commutator disk and the coil disk have substantially the same outer diameter.

5. The disk motor according to claim 1, wherein the radiating pattern is provided on at least a surface of the commutator disk that contacts with the electric current supply part.

6. The disk motor according to claim 1, wherein the radiating pattern is divided into a plurality of segments in at least one of a radial direction and a circumferential direction.

7. The disk motor according to claim 1, wherein the radiating pattern and the commutator pattern are made of the same material.

8. The disk motor according to claim 1, wherein the radiating pattern includes an extended radiating pattern which extends from the commutator pattern.

9. The disk motor according to claim 8, wherein the commutator pattern is divided into a plurality of segments, and
    wherein the extended radiating pattern does not short-circuit between different segments of the commutator pattern.

10. The disk motor according to claim 1, wherein the radiating pattern includes an insulated radiating pattern which is insulated from the commutator pattern.

11. An electric working machine comprising the disk motor according to claim 1.

12. The disk motor according to claim 1, wherein the conductive material forming the heat-dissipation path is separate from a current path and located on the surface of the commutator disk.

13. The disk motor according to claim 1, wherein the radiating pattern is formed by carrying out an etching process after masking the conductive material.

14. A disk motor comprising:
    an output shaft configured to be rotated by a rotational force of a rotor,
    at least one coil disk, and
    a magnetic flux generating part opposed to the coil pattern of the coil disk,
    wherein the rotational force of the rotor is obtained by an electromagnetic force between an electric current flowing in the coil pattern and a magnetic field generated by the magnetic flux generating part,
    wherein a radiating pattern, which is a printed-wiring, is provided to an outer periphery side of the output shaft, is provided at a position in a radial direction that faces the magnetic flux generating part, is provided to overlap the coil pattern of the coil disk in the axial direction of the output shaft, and is provided to be sandwiched between the magnetic flux generating part and the coil pattern of the coil disk.

* * * * *